United States Patent [19]

Bradbury

[11] 4,179,774
[45] Dec. 25, 1979

[54] CABLE CLAMPS
[75] Inventor: Stanley A. Bradbury, London, England
[73] Assignee: Cable Supports Limited, Great Britain
[21] Appl. No.: 917,971
[22] Filed: Jun. 22, 1978
[51] Int. Cl.² ............................................. F16G 11/00
[52] U.S. Cl. ................ 24/132 R; 24/81 CC; 24/249 LS; 24/262; 248/68 R
[58] Field of Search .............. 24/262, 73 SA, 73 AS, 24/81 CC, 244 R, 249 LS, 132 R, 16 R; 248/68 R, 68 CB

[56] References Cited
U.S. PATENT DOCUMENTS

| 3,654,668 | 4/1972 | Appleton | 24/16 R |
| 3,682,422 | 8/1972 | Evans | 248/68 CB |
| 3,893,647 | 7/1975 | Kennedy | 248/68 R |
| 4,004,326 | 1/1977 | Beavers | 24/81 CC |

FOREIGN PATENT DOCUMENTS

| 722084 | 1/1955 | United Kingdom | 248/68 R |
| 1096000 | 12/1967 | United Kingdom | 248/68 R |

*Primary Examiner*—Philip C. Kannan
*Attorney, Agent, or Firm*—Jacobi, Lilling & Siegel

[57] ABSTRACT

A cable clamp comprises a base member having two arms, each arm being attached to the base member at spaced apart locations thereon. The arms are pivotably mounted on the base member and a bolt and a nut are provided for securing the free ends of the arms together. Each of the base member and the arms has a pad for gripping a cable or group of cables. Each of the arms having two longitudinal grooves, one in each side edge of the arm and each arm pad having projections which engage in said grooves so that the arm pads are slidable for at least limited movement along said arms.

9 Claims, 4 Drawing Figures

U.S. Patent
Dec. 25, 1979
4,179,774
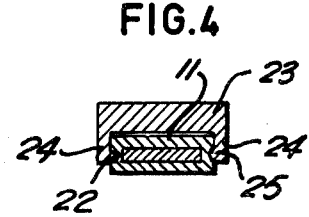
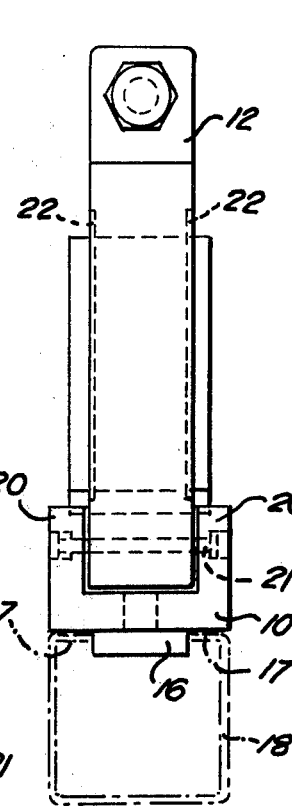
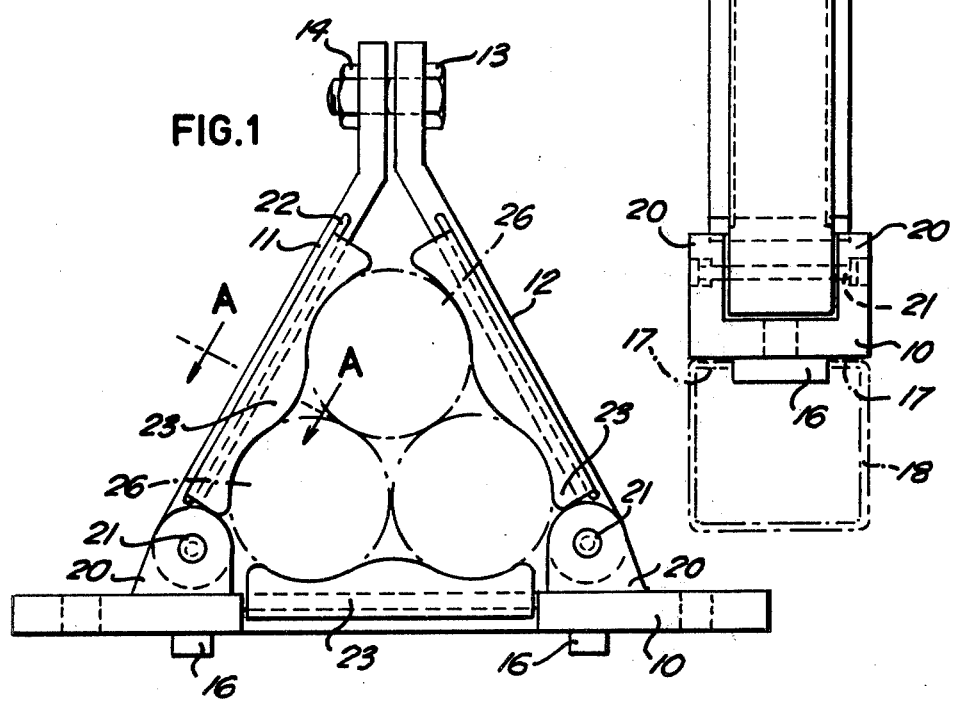
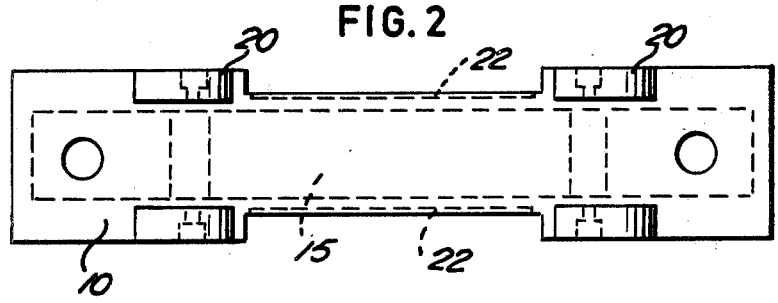

4,179,774

CABLE CLAMPS

BACKGROUND OF THE INVENTION

1. Field of the Invention

This invention relates to clamps for cables and is concerned more particularly with clamps of the kind known as trefoil clamps and comprising a base member with two clamping arms, attached each at one end thereof to the base member at spaced positions thereon, at least one of the arms being pivotally attached to the base member, and with means for securing the other ends of the two arms together so that a cable or group of cables may be held tightly in the region between the arms and the base.

2. Description of Prior Art

Such cable clamps are known as trefoil clamps or cleats because they are commonly used for clamping together a group of three cables. It is known to fit a pad on the base and on each arm, the pads having recesses shaped to receive part of the periphery of the cable or group of cables. For a group of three cables, these pads define a trefoil shape. Such pads may be interchangeable to accommodate different size cables. It is known to mount the pads on a screw or pin so that they are rockable to enable the pads to adapt themselves in position to irregular exterior shapes of the cables.

SUMMARY OF THE INVENTION

The invention provides a clamp having:
a base member;
two arms, each defining two longitudinal grooves, one in each side edge of the respective arms;
first means for mounting one of the arms at one end thereof at a first location on said base member;
second means for mounting the other of the arms at one end thereof at a second location on said base member, said second location being spaced from said first location and at least one of the arms being pivotally attached to the base member;
means for securing the other ends of the arms together; and
a pad for each of said arms and base member for gripping a cable or group of cables in the region between the arms and base, each of the pads for the arms having projections for engaging in the grooves of their respective arms so that the pads for the arms are slidable for at least limited movement along their respective arms.

With this construction, when the two arms are tightened together, e.g. by a bolt, the pads are forced against the cable or cables and there is a wedging action which, if a clamp is holding a group of cables, forces the cables together, pressing them downwardly onto the base. The grooves in the arms permit sliding movement of the pads so that they will take up correct positions in relation to the cable allowing for possible variations and deformities in the size of the cables. The length of the grooves need only be sufficient to permit the required movement.

Conveniently the base member has similar grooves on its side so that the pad on the base member, which may be similar to the pads on the side arms, is also movable within limits allowed by the groove. The arms and base of the clamp are each conveniently manufactured from a plastics material, such as nylon or glass-filled nylon, with a metal core, such as steel.

BRIEF DESCRIPTION OF THE DRAWINGS

FIG. 1 shows an end view of a clamp around a group of three cables;
FIG. 2 is a plan view of the base member of the clamp of FIG. 1;
FIG. 3 is a side elevation of the clamp of FIG. 1 showing a channel member for locating the clamp; and
FIG. 4 is a section along the line A—A of FIG. 1.

DESCRIPTION OF THE PREFERRED EMBODIMENTS

Referring to the drawings, the clamp comprises a base member 10 with two arms 11, 12. These arms 11, 12 at one end are pivotally mounted to the base member at spaced points thereon and at the other end can be secured together by a bolt and nut 13, 14. The base member 10 is moulded of glass-filled nylon material around a steel core 15 (FIG. 2). This base member 10 has two downwardly-extending lugs 16 for locating the clamp between inwardly-directed flange portions 17 of a channel 18, as shown in FIG. 3, thereby ensuring that the clamp remains at 90° to the required line of the cable. The arms 11, 12 are each pivoted between respective pairs of upstanding lugs 20 by means of a metal pin 21 passing through these lugs 20 and through the arms 11, 12. Conveniently the pin 21 is threaded along at least part of its length for securing it in position. The arms 11, 12, like the base 10, are formed by moulding glass-filled nylon around a steel core. The arms 11, 12 along the centre part of their length, and the base along the centre portion of its length, are each of rectangular section with longitudinal grooves 22 extending along their side faces. Pads 23 formed of moulded glass-filled nylon are provided on each of the arms and base. As shown in FIG. 4 each of these pads 23 is shaped to have two side portions 24 partially embracing the respective arms or base, the side portions 24 having inwardly-extending longitudinal projections 25 which snap into the aforementioned grooves 22 when the pads 23 are forced onto their respective arms or base. These pads 23 are shaped in accordance with the particular cable or cables to be clamped. In the example shown in FIG. 1 each pad 23 has two grooves shaped to extend partially around two cables whereby three cables 26 may be secured in the region between the arms 11, 12 and base 10. A clamp may readily be assembled by putting on appropriate pads 23 to suit the size and shape of the cable or cables to be secured. It will be seen that when the arms 11, 12 are tightened together by the nut and bolt 13, 14, the cables 26 are forced together and the pads 23 will slide along the arms as necessary to take up the appropriate position. The grooves 22 in conjunction with the projections 25 are made sufficiently long to accommodate any required movement of the pads 23.

I claim:
1. A cable clamp having:
a base member;
two arms, each defining two longitudinal grooves, one in each side edge of the respective arms;
first means for mounting one of the arms at one end thereof at a first location on said base member;
second means for mounting the other of the arms at one end thereof at a second location on said base member, said second location being spaced from said first location and at least one of the arms being pivotally attached to the base member;

means for securing the other ends of the arms together; and a pad for each of said arms and base member for gripping a cable or group of cables in the region between the arms and base, each of the pads for the arms having projections for engaging in the grooves of their respective arms so that the pads for the arms are slidable for at least limited longitudinal movement along their respective arms.

2. A cable clamp as claimed in claim 1 wherein the pads are made of a slightly resilient material so that they can be forced onto the arms.

3. A cable clamp as claimed in claim 2 wherein the pads are formed from moulded nylon.

4. A clamp as claimed in claim 1 wherein the projections are in the form of inwardly extending ribs on side arms of a channel shaped portion of the pad so that the pad can be resiliently forced onto an arm of the clamp with the projections snapping into the grooves on the arm to retain the pad in position yet permitting limited longitudinal movement along the arm.

5. A cable clamp as claimed in claim 1 wherein the means for securing the other ends of the arms comprises a bolt between the arms for securing the outer ends of the arms together.

6. A cable clamp as claimed in claim 1 wherein the base member also has longitudinal grooves in its sides to receive a pad having projections engaging in the grooves to permit limited movement of the pad on the base member.

7. A cable clamp as claimed in claim 1 wherein the arms and the base of the clamp are each manufactured from a plastics material with a metal core.

8. A cable clamp as claimed in claim 7 wherein the plastics material is nylon or glass-filled nylon.

9. A cable clamp as claimed in claim 7 wherein the core is of steel.

* * * * *